United States Patent [19]
Steiner

[11] 3,921,237
[45] Nov. 25, 1975

[54] THINWALL REAMING PLIERS FOR ELECTRICAL CONDUIT

[76] Inventor: Paul Carl Steiner, RR1 Box 98, Johnsonville, Ill. 62850

[22] Filed: Jan. 28, 1974

[21] Appl. No.: 400,938

[52] U.S. Cl............................. 7/5.4; 15/236; 29/78
[51] Int. Cl................................................ B25f 1/00
[58] Field of Search.............. 7/3 R, 4, 5.1, 5.4, 1 E; 81/425 R, 418; 29/78; 15/104.02, 104.03, 236 R

[56] References Cited
UNITED STATES PATENTS
| | | | |
|---|---|---|---|
| 1,122,165 | 12/1914 | Schoening | 7/3 R |
| 1,902,913 | 3/1933 | Sievern | 7/5.1 |

FOREIGN PATENTS OR APPLICATIONS
| | | | |
|---|---|---|---|
| 597,160 | 1/1948 | United Kingdom | 7/5.1 |
| 181,250 | 6/1922 | United Kingdom | 7/1 E |

*Primary Examiner*—Al Lawrence Smith
*Assistant Examiner*—Roscoe V. Parker

[57] ABSTRACT

A plier like conduit reaming and notching tool having opposed aligned engaging jaw members each defined by an inner abutting edge and an outer edge surface having the forward end thereof joined with the inner edge surface to define a sharp nose shaped forward end, the outer edge tapering outwardly terminating in a sharp edge with each inner edge surface including a semi-circular aperture extending transversely therethrough having a plurality of radially extending fingers projecting from the jaw member into the aperture, the leading ends of such fingers being spaced apart in a manner to form when the jaw is closed a passage therebetween adapted to receive a length of conduit therebetween for reaming the outer peripheral end edge of such conduit by imparting to the tool a back and forth circular motion normal to the axis of the conduit. Similarly, the tapered sharpened outer edge surfaces are adapted to ream the inner peripheral edges of a length of conduit by inserting the nose of the tool axially thereinto and then rotating the tool about its axis in a circular motion to ream the inner conduit edge.

4 Claims, 5 Drawing Figures

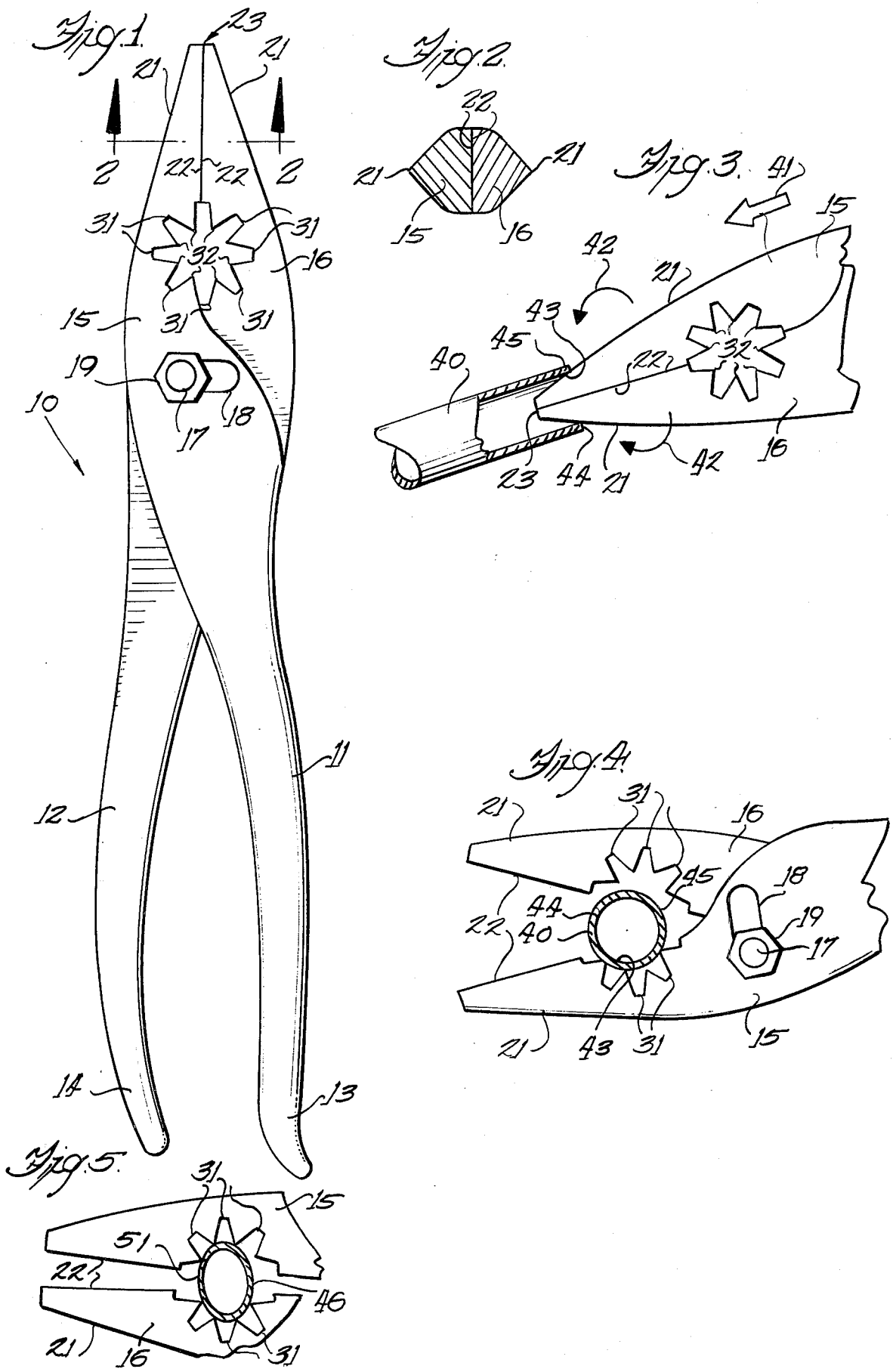

3,921,237

1

THINWALL REAMING PLIERS FOR ELECTRICAL CONDUIT

BACKGROUND OF THE INVENTION

1. Field of the Invention

This invention relates generally to a combination tool for use in the electrical field for reaming the inner and outer peripheral ends of a cylindrical length of thin wall type conduit so that it will fit or easily slip into a connector or fitting adapted to secure lengths of conduit together, or to an electrical box, or the like.

2. Description of the Prior Art

In the joining together of thinwall electrical conduit, it is required that the conduit be cut to the desired length after which the cut edge must be reamed both about the outer peripheral edge surface as well as about the inner peripheral edge surface in a manner to remove all rough edges and projecting metal fragments produced by the cutting process. The adjacent lengths of conduit are then axially aligned with there normally being placed therebetween a conventional type cylindrical thinwall connector having opposed aligned sockets to receive therein the adjacent ends of the conduit so as to retain the conduit lengths connected together.

It is thus required that both an outer reaming tool and an inner reaming tool be carried about by the conduit installer.

SUMMARY OF THE INVENTION

The present invention seeks to eliminate the difficulties associated in the carrying of a multiplicity of tools by providing a simple and inexpensive tool which is easy to use and which permits the reaming of both the inside and outside edges of a cut length of conduit.

Further, the present invention provides a novel and unique tool permitting the connection of lengths of conduits with connectors therebetween by using the tool in one manner to smooth the diameter of an end of one of the lengths of tubing in a manner to be received in a thinwall connector, with the tool then being used to smooth the inside edge of the tubing so as not to damage the electrical wire passed through the tubing when in use.

It is a feature of the present invention to provide a tool permitting for the rapid reaming and connection of lengths of electrical thinwall conduits with a minimum of time and effort making a more economical installation of conduit possible.

A further feature of the present invention provides a reaming plier like tool for use in the reaming and joining of adjacent lengths of electrical thinwalled conduit and which is readily adjustable to receive various diameters of conduits without requiring a multiplicity of tools.

The provision of a conduit reaming plier like tool intended for use with thinwalled electrical conduit, such as briefly outlined above, and possessing the stated advantages, constitutes the principal features of the present invention. The provision of a tool which is simple in its construction and which therefore may be readily manufactured at a minimum expense and by simple manufacturing methods; one which is rugged and durable and which therefore may be guaranteed by the manufacturer to withstand the rough usage normally associated with the construction industry; one which utilizes only three component parts providing for ease of maintenance and utilization thereof; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a top plan view of a tool constructed in accordance with the principles of the present invention;

FIG. 2 is a cross-sectional view taken along line 2—2 of FIG. 1;

FIG. 3 is a fragmentary elevational view of the tool as used to ream the interior inner edge of a length of conduit;

FIG. 4 is a fragmentary front elevational view of the jaw members of the tool placed about the exterior edge surface of a length of conduit to ream the same; and FIG. 5 is a fragmentary front elevational view of a conduit having a distorted diameter with the same being placed in the opening of the jaw members in a manner to utilize the tool to reshape the end of the conduit into a circular configuration.

DESCRIPTION OF THE PREFERRED EMBODIMENT

Referring now to the drawings there is illustrated a preferred form of a tool constructed in accordance with the invention and which is designated in its entirety by the reference numeral 10 and is comprised of a pair of crossed levers 11 and 12 which are pivotally connected together intermediate their end portions in a manner defining corresponding handle members 13 and 14 at one end portion thereof with corresponding jaw members 15 and 16 at the opposite end portion thereof. The pivotal connection for the levers 11, 12 consists of a pivot pin or bolt 17 extending through an aperture (not shown) in lever 12 to be received in an elongated slot 18 in lever 11, the levers being retained together by a nut member 19 threadedly received on pin 17.

Each jaw member 15 and 16 includes an outer edge surface 21 and an inner edge surface 22, the outer edge surface tapering from the portion nearest the pivot forwardly thereof to a nose end 23 of the tool where the outer edge is joined with the inner edge to define a sharp nose for the tool 10. The outer and inner edges 21 and 22 respectively of each jaw member 15 and 16 are in the same or substantially the same plane with each other and are disposed forwardly of the pivot 17.

Each of the outer edge surfaces 21, 21 are tapered in a direction transverse of the associated jaw members 15 and 16 tapering from a base portion which is approximately the full thickness of the jaw member to terminate in a sharp outermost tip edge, the purposes and use thereof which will be later described.

Each of the inner edges 22 are flat and can be used for gripping and twisting electrical wires, each edge 22 including therein a notch forming semi-circular aperture 31 extending therethrough intermediate the pivot pin 17 in the nose end 23 of the tool 10, the apertures in each inner edge lying opposite each other when the tool is in the closed position of the jaws in a manner defining a circular opening, with each aperture having projecting thereinto a plurality of radially extending finger like members 32, each of the fingers partially projecting into the associated aperture 31 with the leading end of each of such fingers when the jaws are closed defining a circle having a lesser diameter than the diameter of a length of conduit with which the tool is intended for use, such as for the range of one-half inch to one inch conduit. The finger members 32 may be of any desired shape or configuration projecting into the associated aperture 31, but it has been found that a preferred embodiment would provide such finger members as being of a triangular shape, as illustrated in the drawings, with the apexes thereof projecting inwardly of the aperture adapted for engagement with a length of conduit. Further, it is preferred that the leading ends of the projections 31 be of a sharpened nature and extend the thickness of the associated jaw members 15 and 16 in order to provide a line of contact with the conduit extending parallel to the axis of the conduit.

For operation of the tool in the reaming of an outer peripheral edge of a length of thinwall electrical tubing, such as seen in FIG. 4, the jaw members 15 and 16 are spread apart and slid over the edge of the conduit 40 in a position substantially normal thereto with the edge 44 of the conduit extending into the aperture 31 between the leading sharpened edges 32 a distance approximately half the thickness of the jaw members, with the handle members 13 and 14 then being moved together until at least some of the leading edges 32 from each of the jaw members are in engagement with the peripheral exterior edge surface 45 of the conduit. Then by imparting to the tool 10 a rotary type back and forth motion in an arcuate path having the center thereof disposed at the axis of the conduit, the leading edges 32 in contact with the conduit will perform a scraping action therealong in a manner reaming the exterior peripheral edge surfaces 45 of the conduit.

In operation to ream the interior peripheral edge surface of a length of conduit, such as seen in FIG. 3, the nose end 23 of the tool is axially aligned with the end of the conduit and is then forced inwardly thereof in the direction of arrow 41 until the outer sharpened edges 21 of the jaw members 15 and 16 engage with the interior edge surface of the conduit, after which the tool is rotated about its longitudinal axis such as indicated by arrows 42 with the outer edges scraping and cleaning the interior peripheral edges 43 of the conduit in a reaming manner.

Yet still a further use of the tool is as illustrated in FIG. 5 where the end of a length of conduit such as designated by reference numeral 51 has been deformed so that it is no longer of a circular cross-section, with it being required that the end portion 46 thereof be restored to an approximate circular cross-section for joining with another length of conduit by using a thinwall connector. The end 52 of the distorted conduit 51 is disposed between the leading edges 32 of the jaw members 15 and 16 with the long axis of the distorted conduit extending substantially perpendicular to the inner edges 22 of the jaw members, after which the handles 13 and 14 are moved inwardly toward one another in a manner providing a compressing force on the exterior surfaces of the conduit end 52, such pressure being continued until the end portion takes on an approximate circular configuration, at which time the tool is removed therefrom and the end of the conduit may be suitably joined to other conduits in the manner as aforedescribed.

There is thus provided a novel tool for accomplishing the reaming and connecting of lengths of thinwalled electrical conduits, with conventional type thinwall connectors being utilized, and which also permits the reshaping of a distorted end of a conduit to restore its circular configuration required for proper fastening to other lengths of conduit or other fixtures; the tool utilizing a minimum number of components thus providing a tool of rugged durability quite suitable for the rough handling normally associated with tools utilized in the construction industry.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

I claim:

1. A conduit reaming and reshaping tool comprising a pair of levers pivoted together intermediate their ends to form handle members on corresponding end portions thereof and to form jaw members on the opposite corresponding end portions thereof of each of the levers, the handles movable toward and away from each other with a pliers like movement effecting corresponding movement of the jaw members, the jaw members being in substantially the same plane with each other for movement toward and away from each other, each jaw member having an inner edge surface and an outer edge surface which are connected together at a forward nose end of the tool providing an elongated tapered sharp nose end for the tool, each outer edge surface extending lengthwise along the jaw from the nose end thereof and tapering transversely outwardly in a direction opposed to the inner edge of the jaw and terminating in a very sharp edge, each outer edge having a base portion approximately the full thickness of the jaw member and tapering outwardly therefrom to the sharp outermost edge, the inner edge surface of each jaw disposed in opposed alignment to one another in a manner to confront each other with each inner edge including therein a semi-circular aperture extending therethrough intermediate the pivot mounting and the tool nose end, the apertures lying opposite each other in the closed position of the jaw members in a manner defining a circular opening therethrough, a plurality of radially extending fingers projecting from each of the jaws into the associated aperture, the leading ends of each of the fingers providing a substantially circular passage therebetween when the jaws are in the closed position, the passage being of a lesser diameter than the diameter of a length of electrical type conduit intended to be received in the passage, the leading ends of the fingers adapted to selectively engage and circumferally surround the conduit inserted through the passage for purposes of reaming the outer peripheral edge end surfaces thereof.

2. The tool as set forth in claim 1 wherein the pivot mounting includes an elongated slot extending transversely of one of the levers, and a bolt like member projecting normal to the other lever adapted for insertion through the slot and secured loosely therein by a nut fastened on the end thereof such that the spacing between the inner edges of the jaw members may be varied to accomodate different diameter electrical type conduits therebetween with the range of about one-half inch to about one inch in diameter.

3. The tool as set forth in claim 2 wherein the fingers are each triangularly shaped members having their base portions extending substantially the complete thickness of the associated jaw member with the apex thereof forming the leading end extending into the aperture adapted for engagement with a length of electrical conduit inserted therethrough.

4. The tool as set forth in claim 3 wherein the leading end of the fingers is a sharp edge extending the thickness of the jaw member.

* * * * *